US012075113B1

(12) United States Patent
Almeida et al.

(10) Patent No.: US 12,075,113 B1
(45) Date of Patent: *Aug. 27, 2024

(54) SEAMLESS AND AUTOMATIC TRANSMISSION OF PROVISIONING DATA

(71) Applicant: CSC Holdings, LLC, Bethpage, NY (US)

(72) Inventors: Heitor J. Almeida, Elmsford, NY (US); Jaison Antony, Dix Hills, NY (US); John Markowski, Smithtown, NY (US); Peter Caramanica, Westbury, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,339

(22) Filed: Jun. 1, 2023

Related U.S. Application Data

(63) Continuation of application No. 17/563,834, filed on Dec. 28, 2021, now Pat. No. 11,689,761, which is a continuation of application No. 17/137,899, filed on Dec. 30, 2020, now Pat. No. 11,212,576.

(51) Int. Cl.
| | |
|---|---|
| *H04N 21/435* | (2011.01) |
| *H04N 5/50* | (2006.01) |
| *H04N 21/426* | (2011.01) |
| *H04N 21/438* | (2011.01) |

(52) U.S. Cl.
CPC ............ *H04N 21/435* (2013.01); *H04N 5/50* (2013.01); *H04N 21/4263* (2013.01); *H04N 21/4383* (2013.01)

(58) Field of Classification Search
CPC ............ H04N 21/266; H04N 21/2187; H04N 21/231; H04N 21/2543; G06Q 20/3672; G06Q 2220/00; H04L 65/1069; H04L 65/1093; H04L 65/403
See application file for complete search history.

(56) References Cited

U.S. PATENT DOCUMENTS

| | | |
|---|---|---|
| 10,827,210 B1 | 11/2020 | Almeida et al. |
| 11,212,576 B1 | 12/2021 | Almeida et al. |
| 2005/0091699 A1 | 4/2005 | Poli et al. |
| 2018/0246193 A1 | 8/2018 | Kline et al. |

*Primary Examiner* — Anthony Bantamoi
(74) *Attorney, Agent, or Firm* — Sterne, Kessler, Goldstein & Fox P.L.L.C.

(57) ABSTRACT

Embodiments include a system, method, and a computer program product for installing operating data on a device. For example, the method may include searching a plurality of channels to locate a message on an active channel for the device, the message being transmitted on each of the plurality of channels; in response to locating the message, analyzing the message to determine a second channel from among the plurality of channels for downloading the operating data for the device, the second channel being different than the first channel; in response to determining the second channel, tuning the device to the second channel; downloading, via the second channel, the operating data for the device; and installing the operating data on the device.

20 Claims, 5 Drawing Sheets

SEAMLESS AND AUTOMATIC TRANSMISSION OF PROVISIONING DATA

CROSS-REFERENCE TO RELATED APPLICATIONS

This application is a continuation of U.S. patent application Ser. No. 17/563,834, filed Dec. 28, 2021, which is a continuation of U.S. patent application Ser. No. 17/137,899, filed Dec. 30, 2020, now U.S. Pat. No. 11,212,576, each of which is incorporated by reference herein in its entirety.

BACKGROUND

Digital television adapters/customer premise equipment (DTA/CPEs) are devices configured to receive one-way communications from a headend server of a content provider via a broadcast signal. Conventionally, DTA/CPEs are simple, affordable devices with limited hardware that are capable of tuning to one radio frequency (RF) frequency. In order to set up and/or troubleshoot such devices, users must contact the content provider, which is costly and inefficient for content providers and time consuming for the users.

BRIEF DESCRIPTION OF THE DRAWINGS/FIGURES

DETAILED DESCRIPTION OF EMBODIMENTS

Embodiments of the present disclosure provide a universal messaging system that broadcasts an in-band messaging bus service ("IMB message") to subscriber devices indicating which frequency is carrying operating data and/or firmware updates, such that subscriber devices may tune to that frequency in order to download and install the operating data and/or updated operating data without any user involvement. As a result, the present disclosure eliminates extraneous costs and inefficiencies involved with installing/updating the subscriber devices.

Figure 1A:
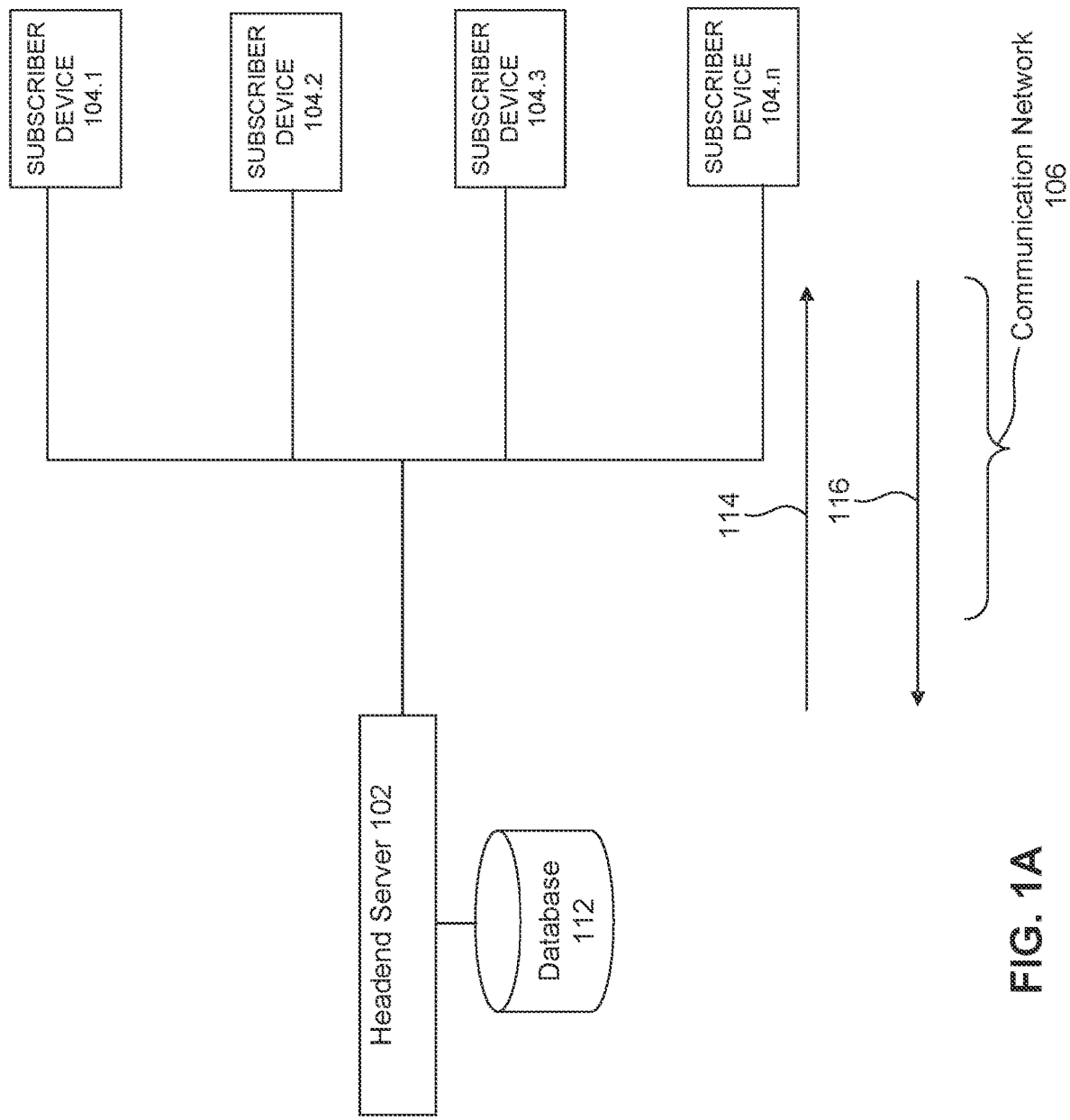
FIG. 1A illustrates a block diagram of an exemplary point-to-multipoint communication system according to aspects of the present disclosure.

FIG. 1A illustrates a block diagram of a point-to-multipoint communication system according to embodiments of the present disclosure. As illustrated in FIG. 1A, the communication system 100 includes a headend server 102, subscriber devices 104.1 through 104.n, a communication network 106, and a database 112. The communication system 100 may be configured to facilitate bi-directional and/or unilateral communication of information, such as video, audio, and/or data to provide some examples, between the headend server 102 and the subscriber devices 104.1 through 104.n. As used herein, the term "downstream direction 114" refers to the transfer of information in a first direction from the headend server 102 to the subscriber devices 104.1 through 104.n. The term "upstream direction 116" refers to the transfer of information in a second direction from the subscriber devices 104.1 through 104.n to the headend server 102. In some embodiments, the subscriber devices 104.1 through 104.n may include, for example, one or more DTA/CPEs that are capable of unilateral communications with the headend server 102, i.e., receiving communications from the headend server 102 in the downstream direction 114, one or more set-top-boxes that are capable of bi-directional communications with the headend server 102, or a combination of both.

The communication network 106 may provide a point-to-multipoint topology for the high speed, reliable, and secure transport of information between the headend server 102 and the subscriber devices 104.1 through 104.n. As will be appreciated by those skilled in the relevant art(s), the communication network 106 may include coaxial cable, fiber optic cable, or a combination of coaxial cable and fiber optic cable linked via one or more fiber nodes, and may include frequency translation devices in support of a frequency stacking architecture, and may even include wireless links without departing from the spirit and scope of the present disclosure. In some embodiments, the headend server 102 may be implemented as a cable modem termination system (CMTS) of a cable communication system, as an optical line terminal (OLT) of a Passive Optical Network (PON), or as any other suitable centralized entity in a point-to-multipoint communication system that will be apparent to those skilled in the relevant art(s) without departing from the spirit and scope of the present disclosure.

The headend server 102 may be a computing device, implemented on one or more processors. In some embodiments, the headend server 102 may broadcast the IMB message to the subscriber devices 104.1 through 104.n, as discussed in U.S. patent application Ser. No. 15/373,168, filed on Dec. 8, 2016, the contents of which are hereby incorporated by reference in their entirety. In some embodiments, the headend server 102 may transmit the IMB message on a plurality of frequencies. For example, the plurality of frequencies may include one hundred fifty-eight (158) different frequencies, e.g., quadrature amplitude modulation (QAM) frequencies. It should be understood by those of ordinary skill in the arts that this is merely an example number of frequencies, and that other numbers of frequencies are contemplated in accordance with aspects of the present disclosure. In some embodiments, the IMB message may be transmitted with a long repetition rate, such as 30 Kbits/sec once every 10 seconds. However, it should be understood by those of ordinary skill in the art that the IMB message may be broadcast using more or less bandwidth and at different intervals based on the size of the IMB message.

Figure 1B:
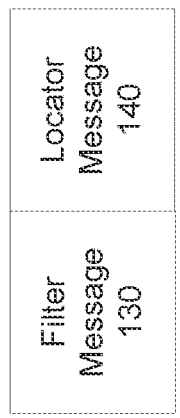
FIG. 1B illustrates an example universal message according to aspects of the present closure.

In some embodiments, the IMB message may include information indicating which subscriber devices from among the subscriber devices 104.1 through 104.n that are targeted to receive the operating data and/or updated operating data. To achieve this, as illustrated in FIG. 1B, the IMB message may include a plurality of messages, such as a filter message 130 and a locator message 140. In some embodiments, the filter message 130 may be used to target the subscriber devices 104.1 through 104.n based on one or more attributes the subscriber devices 104.1 through 104.n. For example, in some embodiments, the one or more attributes may include a first a chip identification ("ID") of the subscriber device, a MAC address of the subscriber device, a group ID of the subscriber device, a bouquet ID of the subscriber device, a network ID of the subscriber device, a service group ID of the subscriber device, a serial number of the subscriber device, or the like.

In some embodiments, the locator message 140 may identify a frequency where the operating data and/or updated operating data may be downloaded. For example, the locator message 140 may include an 8-bit message instructing the subscriber devices 104.1 through 104.*n* where to locate the update, with a value of the 8-bit message indicating where to locate the update. In some embodiments, a first value may instruct the subscriber devices 104.1 through 104.*n* to retrieve the update using a QAM frequency.

In some embodiments, for the subscriber devices 104.1 through 104.*n* that are DTA/CPEs, the subscriber devices 104.1 through 104.*n* may be configured to sequentially scan the plurality of frequencies until it locates the IMB message on an active frequency for the respective subscriber device. That is, the DTA/CPEs 104.1 through 104.*n* may perform a channel discovery process until the DTA/CPEs 104.1 through 104.*n* discover the active frequency carrying the IMB message. In some embodiments, the DTA/CPEs 104.1 through 104.*n* may be programmed to scan the plurality of frequencies based on a predefine sequence. For example, the DTA/CPEs 104.1 through 104.*n* may be programmed to scan the plurality of frequencies from the most frequently used frequency to the least frequently used frequency, as defined by an administrator of the headend server 102. It should be understood by those of ordinary skill in the arts that this is merely one example and that other orders for scanning the plurality of frequencies are further contemplated in accordance with aspects of the present disclosure.

In some embodiments, after locating the IMB message, the DTA/CPEs 104.1 through 104.*n* may analyze the filter message 130 to determine which locator message 140 to further analyze. In some embodiments, a first value of the filter message 130 may instruct DTA/CPEs of a given manufacturer and model to analyze a first locator message, a second value of the filter message 130 may instruct the DTA/CPEs of a different manufacturer and/or different model to analyze a second locator message, and so on and so forth. In response to determining which locator message 140 to further analyze, the DTA/CPEs 104.1 through 104.*n* may analyze the identified locator message 140 to identify the second frequency for downloading the operating data and/or the updated operating data. In some embodiments, the locator message may be include an 8-bit message instructing the DTA/CPEs 104.1 through 104.*n* which frequency from among the plurality of frequencies to download the operating data and/or updated operating data.

In some embodiments, the DTA/CPEs 104.1 through 104.*n* may include a tuner, e.g., a QAM tuner, used to tune the DTA/CPEs 104.1 through 104.*n* to the second frequency. After tuning to the second frequency, the DTA/CPEs 104.1 through 104.*n* may download the operating data and/or updated operating data from the headend server 102 and install the downloaded operating data and/or updated operating data. In some embodiments, the operating data and/or updated operating data may include provisioning data that enables the DTA/CPEs 104.1 through 104.*n* to provide the requested service to the user. For example, the provisioning data may include entitlements, licenses for decrypting content, service package level subscription data, a current time for the DTA/CPEs 104.1 through 104.*n*, a current time zone for the DTA/CPEs 104.1 through 104.*n*, a zip code for the DTA/CPEs 104.1 through 104.*n*, and a channel lineup for the DTA/CPEs 104.1 through 104.*n*. It should be understood by those of ordinary skill in the art that there are merely examples of the types of information included in the provisioning data and that other types of information are further contemplated in accordance with aspects of the present disclosure. In some embodiments, after downloading the operating data and/or updated operating data from the headend server 102, the DTA/CPEs 104.1 through 104.*n* may tune back to the active frequency.

In some embodiments, the DTA/CPEs 104.1 through 104.*n* may be configured periodically download the updated operating data from the headend server 102. For example, after the initial installation of the operating data, the DTA/CPEs 104.1 through 104.*n* may be configured to tune back to the second frequency at predefined intervals, e.g., every two days, to download updated operating data. For example, the updated operating data may include renewed entitlements and licenses for decrypting the content. In some embodiments, after downloading the updated operating data from the headend server 102, the DTA/CPEs 104.1 through 104.*n* may tune back to the active frequency.

In some embodiments, after the operating data has been installed on the DTA/CPEs 104.1 through 104.*n*, a user may request new services from the cable provider, such as new channel subscriptions and/or on-demand content. In such scenarios, the headend server 102 may be configured to transmit the updated operating data to the DTA/CPEs 104.1 through 104.*n* and notify the specific DTA/CPE of the transmission of the updated data transmission. To achieve this, the filter message 130 may include information indicating which specific DTA/CPE is being targeted based on, for example, a serial number of the subscriber device. In some embodiments, the DTA/CPEs 104.1 through 104.*n* may be directed back to the second frequency or a different frequency to download the updated operating data. In some embodiments, the headend server 102 may begin to transmit the updated content prior to notifying the specific DTA/CPE of the update, such that the content is immediately available to the specific DTA/CPE when it tunes to the second frequency.

In some embodiments, the DTA/CPEs 104.1 through 104.*n* may be disconnected from the headend server 102 for an extended period of time, e.g., during travel periods or during an "off-season" at vacation destinations, such that the active channel for the DTA/CPEs 104.1 through 104.*n* may have changed from the last time the DTA/CPEs 104.1 through 104.*n* tuned to the active channel. In such instances, the DTA/CPEs 104.1 through 104.*n* may be configured to relocate the IMB as though the DTA/CPEs 104.1 through 104.*n* was being installed for the first time.

In some embodiments, the DTA/CPEs 104.1 through 104.*n* may be grouped based on a geographic region. This may be implemented to minimize traffic on any given frequency, such that the operating data and/or updated operating data may be transmitted as fast as possible to each geographic region. For example, each geographic region may include up to 100,000 subscriber devices 104.1 through 104.*n*. Assuming that that each of the 100,000 subscriber devices 104.1 through 104.*n* is a DTA/CPE, the headend server 102 may transmit the operating data to the subscriber devices 104.1 through 104.*n* in approximately one minute. However, in some geographic regions, the subscriber devices 104.1 through 104.*n* may include both DTA/CPEs and set-top-boxes, and as such, the operating data for the DTA/CPEs may be transmitted in less than one minute, e.g., 10 seconds. That is, when the number of DTA/CPEs is less than a total number of subscriber devices 104.1 through 104.*n* in the geographic region, the operating data may be transmitted at a faster transmission rate, as should be understood by those of ordinary skill in the arts. For example, in some embodiments, the operating data and/or updated operating data may be transmitted at a rate between 6 and 7 megabytes per second (MB/s).

Figure 2:
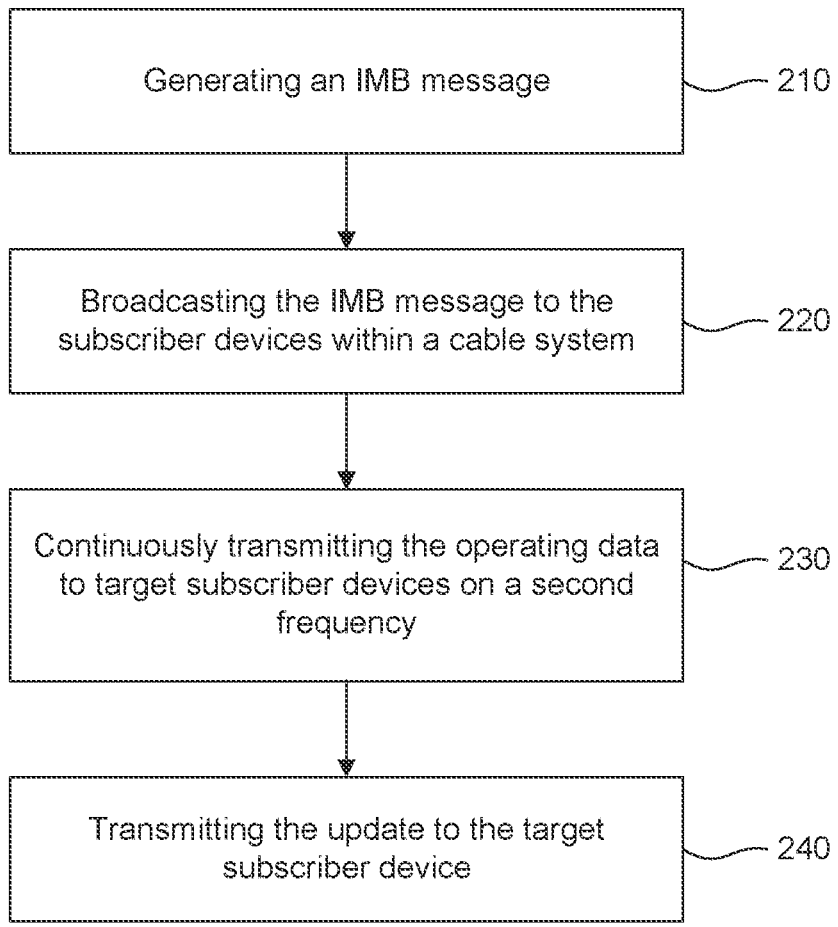
FIG. 2 illustrates an example of a process flow for sending updates to a plurality of subscriber devices in a cable system according to aspects of the present disclosure.

FIG. 2 illustrates an example of a process flow for sending updates to a plurality of subscriber devices in a cable system. At 210, a method 200 includes generating an IMB message 210. At 220, the method 220 includes broadcasting the IMB message on a first frequency to the subscriber devices within a cable system. And, at 230, the method includes continuously transmitting the operating data to target subscriber devices on a second frequency.

Figure 3:
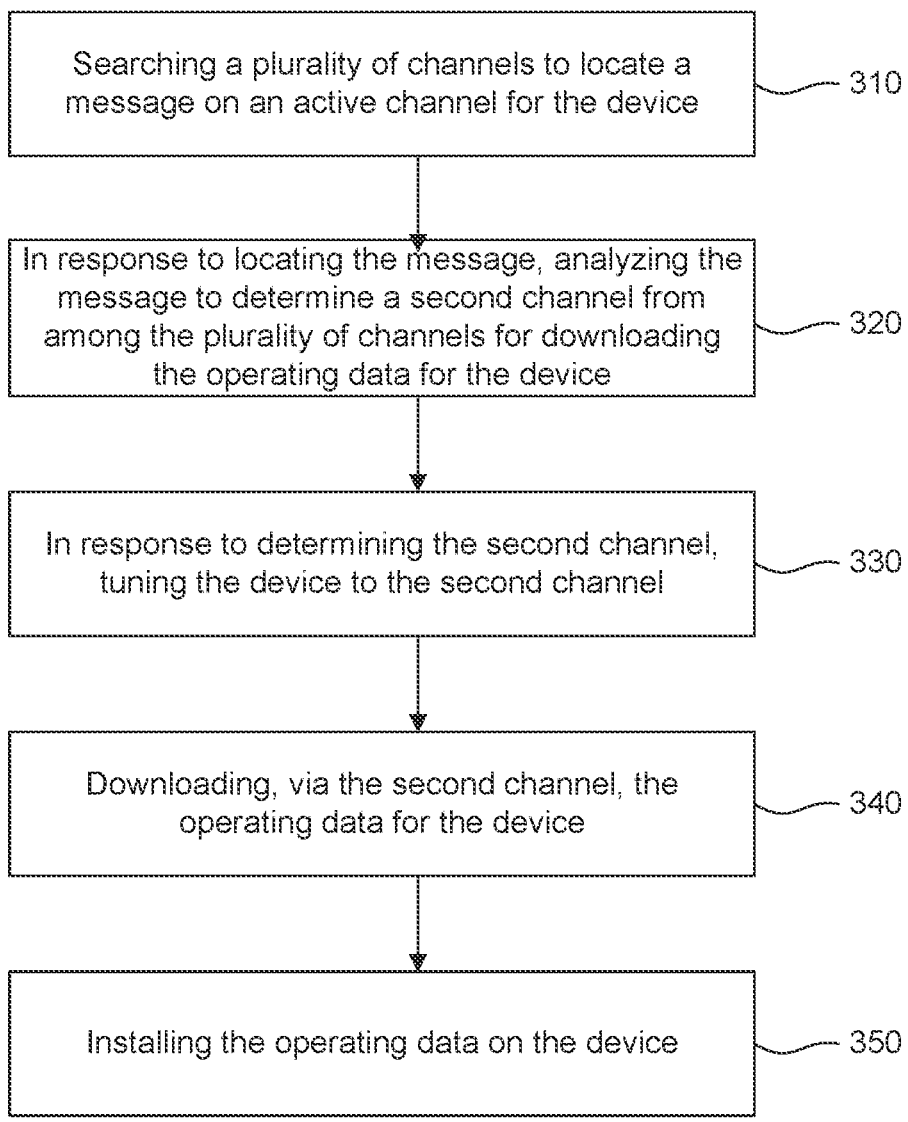
FIG. 3 illustrates an example of a process flow for processing an in-band messaging bus service ("IMB message") message in an subscriber device according to aspects of the present disclosure.

FIG. 3 illustrates an example of a process flow for installing operating data on a device. For example, at 310, a method 300 may include searching a plurality of channels to locate a message on an active channel for the device. The message may be transmitted on each of the plurality of channels. At 320, in response to locating the message, the method 300 may include analyzing the message to determine a second channel from among the plurality of channels for downloading the operating data for the device. At 330, in response to determining the second channel, the method may include, tuning the device to the second channel. At 340, the method 300 may include downloading, via the second channel, the operating data for the device, and, at 350, the method may also include installing the operating data on the device.

Figure 4:
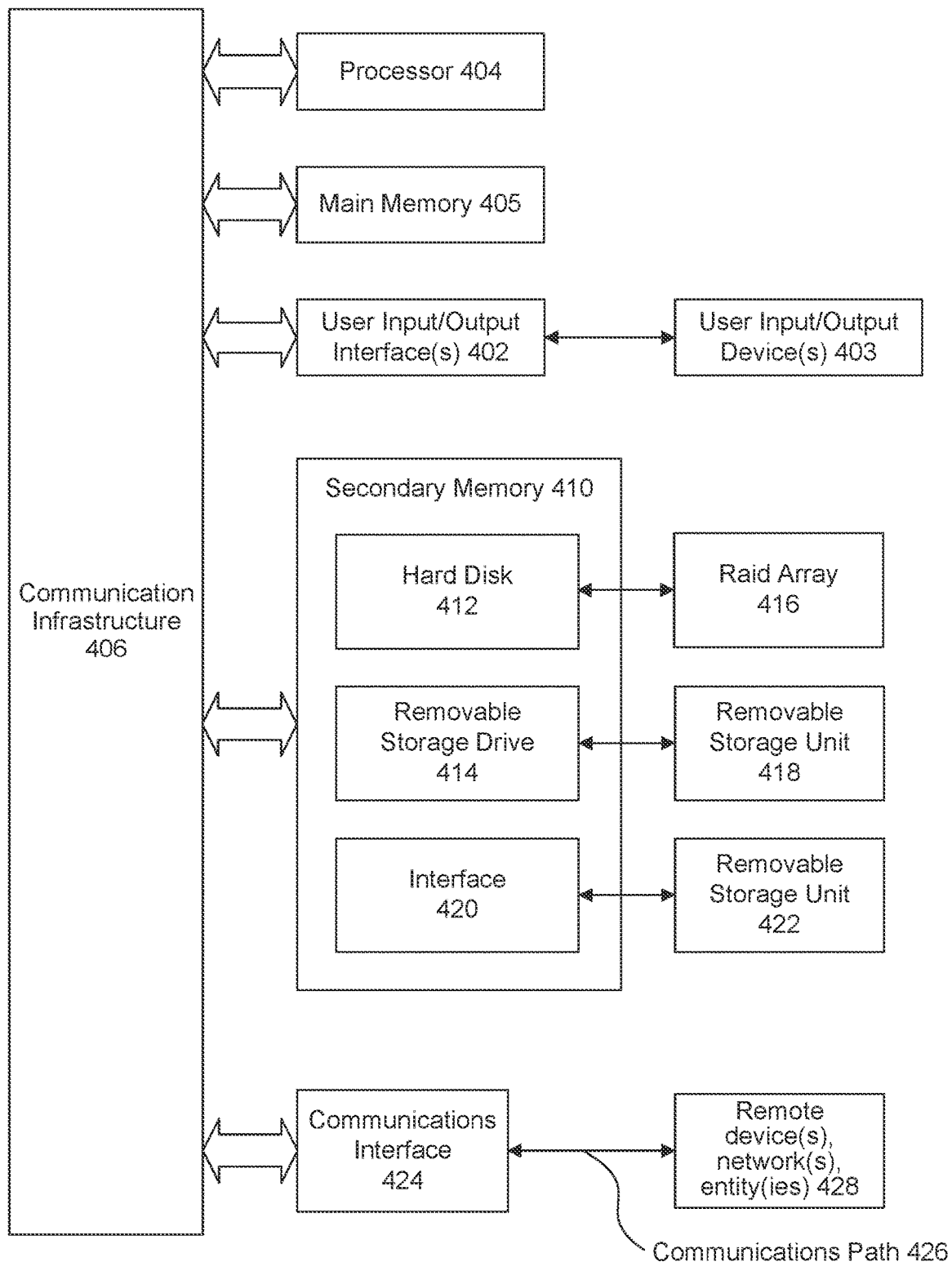
FIG. 4 illustrates an example computer system which may be used to implement embodiments according to aspects of the present disclosure according to aspects of the present disclosure.

Various aspects of the disclosure may be implemented by software, firmware, hardware, or a combination thereof. FIG. 4 illustrates an example computer system 400 in which some embodiments, or portions thereof, may be implemented as computer-readable code. Various embodiments are described in terms of the example computer system 400. After reading this description, it will become apparent to a person skilled in the relevant art how to implement the embodiments using other computer systems and/or computer architectures.

Computer system 400 includes one or more processors, such as processor 404. Processor 404 may comprise suitable logic, circuitry, dedicated circuits, and/or code that may enable processing data and/or controlling operations of computer system 400. Processor 404 may be a special purpose or a general purpose processor. Processor 404 is connected to a communication infrastructure 406 (for example, a bus or network). Processor 404 may be enabled to provide control signals to the various other portions of computer system 400 via communication infrastructure 406, for example.

Computer system 400 also includes a main memory 408, and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. that is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 that allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals that may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 408 and secondary memory 410, which may be memory semiconductors (e.g., DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the embodiments as discussed herein. In particular, the computer programs, when executed, enable processor 404 to implement the disclosed processes. Accordingly, such computer programs represent controllers of the computer system 400. Where the embodiments are implemented using software, the software may be stored in a computer program product and loaded into computer system 400 using removable storage drive 414, interface 420, hard drive 412 or communications interface 424. This may be accomplished, for example, through the use of general-programming languages (such as C or C++). The computer program code may be disposed in any known computer-readable medium including semiconductor, magnetic disk, or optical disk (such as, CD-ROM, DVD-ROM). As such, the code may be transmitted over communication networks including the Internet and internets. It is understood that the functions accomplished and/or structure provided by the systems and techniques described above may be represented in a core (such as a processing-unit core) that is embodied in program code and may be transformed to hardware as part of the production of integrated circuits. This may be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the embodiments and the appended claims in any way.

The accompanying drawings, which are incorporated herein and form part of the specification, illustrate the embodiments and, together with the description, further serve to explain the principles of the embodiments and to enable a person skilled in the pertinent art to make and use the embodiments. The embodiments will be described with reference to the accompanying drawings. Generally, the drawing in which an element first appears is typically indicated by the leftmost digit(s) in the corresponding reference number.

The embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concepts of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A method for downloading data from a headend server within a communication system, the method comprising:
    receiving, by a plurality of subscriber devices within the communication system, an in-band messaging bus service (IMB) message from the headend sever on a first frequency, the IMB message including a filter message and a plurality of locator messages;
    analyzing, by the plurality of subscriber devices, the IMB message to identify the filter message from the IMB message;
    analyzing, by a first subscriber device from among the plurality of subscriber devices, a first locator message from among the plurality of locator messages in response to the filter message being a first value to identify a second frequency where the data is to be downloaded by the first subscriber device;
    analyzing, by a second subscriber device from among the plurality of subscriber devices, a second locator message from among the plurality of locator messages in response to the filter message being a second value to identify the second frequency where the data is to be downloaded by the second subscriber device; and
    tuning, by the first subscriber device or the second subscriber device, to the second frequency to download the data.

2. The method of claim 1, wherein the first frequency is from among a plurality of first frequencies, and
    wherein the receiving comprises sequentially scanning the plurality of first frequencies until locating the IMB message on the first frequency.

3. The method of claim 1, wherein the receiving comprises receiving the IMB message on the first frequency in response to a plurality of subscribers that are associated with the plurality of subscriber devices requesting new services from a service provider of the communication system.

4. The method of claim 1, wherein the analyzing the IMB message to identify the filter message comprises analyzing the IMB message to identify the first subscriber device and the second subscriber device are being targeted to receive the data.

5. The method of claim 1, wherein the first subscriber device and the second subscriber device are from different manufacturers or are different models.

6. The method of claim 1, wherein the data comprises entitlements and licenses for decrypting content from the headend server, and wherein the tuning comprises tuning at predefined intervals to download renewed entitlements and licenses for decrypting the content from the headend server.

7. The method of claim 1, wherein the analyzing the first locator message comprises analyzing a first plurality of bits of the first locator message to identify the second frequency from among a plurality of second frequencies, and
wherein the analyzing the second locator message comprises analyzing a second plurality of bits of the second locator message to identify the second frequency from among the plurality of second frequencies.

8. A system for downloading data from a headend server within a communication system, the system comprising:
a first subscriber device from among a plurality of subscriber devices within the communication system configured to:
receive an in-band messaging bus service (IMB) message from the headend server on a first frequency, the IMB message including a filter message and a plurality of locator messages,
analyze the IMB message to identify the filter message from the IMB message,
analyze a first locator message from among the plurality of locator messages in response to the filter message being a first value to identify a second frequency where the data is to be downloaded by the first subscriber device, and
tune to the second frequency to download the data; and
a second subscriber device from among the plurality of subscriber devices configured to:
receive the IMB message from the headend server on the first frequency,
analyze the IMB message to identify the filter message from the IMB message,
analyze a second locator message from among the plurality of locator messages in response to the filter message being a second value to identify the second frequency where the data is to be downloaded by the second subscriber device, and
tune to the second frequency to download the data.

9. The system of claim 8, wherein the first frequency is from among a plurality of first frequencies, and
wherein the first subscriber device and the second subscriber device are further configured to sequentially scan the plurality of first frequencies until locating the IMB message on the first frequency.

10. The system of claim 8, wherein the first subscriber device and the second subscriber device are configured to receive the IMB message on the first frequency in response to a first subscriber that is associated with the first subscriber device and a second subscriber that is associated with the second subscriber device, respectively, requesting new services from a service provider of the communication system.

11. The system of claim 8, wherein the first subscriber device and the second subscriber device are further configured to analyze the IMB message to identify the first subscriber device and the second subscriber device, respectively, are being targeted to receive the data.

12. The system of claim 8, wherein the first subscriber device and the second subscriber device are from different manufacturers or are different models.

13. The system of claim 8, wherein the data comprises entitlements and licenses for decrypting content from the headend server, and
wherein the first subscriber device and the second subscriber device are configured to tune at predefined intervals to download renewed entitlements and licenses for decrypting the content from the headend server.

14. The system of claim 8, wherein the first subscriber device is configured to analyze a first plurality of bits of the first locator message to identify the second frequency from among a plurality of second frequencies, and
wherein the second subscriber device is configured to analyze a second plurality of bits of the second locator message to identify the second frequency from among the plurality of second frequencies.

15. A subscriber device for downloading data from a headend server within a communication system, the subscriber device comprising:
a tuner configured to receive an in-band messaging bus service (IMB) message on a first frequency from the headend server, the IMB message including a filter message and a plurality of locator messages that correspond to a plurality of values of the filter message; and
a processor configured to:
analyze the IMB message to identify the filter message from the IMB message, and
analyze a first locator message from among the plurality of locator messages in response to the filter message being a first value from among the plurality of values to identify a second frequency where the data is to be downloaded by the subscriber device,
wherein the tuner is further configured to tune to the second frequency to download the data from the headend server.

16. The subscriber device of claim 15, wherein the first frequency is from among a plurality of first frequencies, and
wherein the subscriber device is further configured to sequentially scan the plurality of first frequencies until locating the IMB message on the first frequency.

17. The subscriber device of claim 15, wherein the subscriber device and a second subscriber device are configured to receive the IMB message on the first frequency in response to a first subscriber that is associated with the subscriber device and a second subscriber that is associated with the second subscriber device, respectively, requesting new services from a service provider of the communication system.

18. The subscriber device of claim 15, wherein the subscriber device and a second subscriber device are configured to analyze the IMB message to identify the subscriber device and the second subscriber device, respectively, are being targeted to receive the data.

19. The subscriber device of claim 15, wherein the subscriber device and a second subscriber device are from different manufacturers or are different models.

20. The subscriber device of claim 15, wherein the data comprises entitlements and licenses for decrypting content from the headend server, and
wherein the subscriber device and a second subscriber device are configured to tune at predefined intervals to download renewed entitlements and licenses for decrypting the content from the headend server.

* * * * *